US 6,557,257 B2

(12) United States Patent
Johnson et al.

(10) Patent No.: US 6,557,257 B2
(45) Date of Patent: May 6, 2003

(54) METHOD FOR REDUCING HARD MACHINING TIME OF A CONSTANT VELOCITY JOINT

(75) Inventors: Scott Johnson, Ortonville, MI (US); Ralf A. Schellhaas, Cologne (DE); Richard L. Seidel, Macomb, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/727,178

(22) Filed: Nov. 30, 2000

(65) Prior Publication Data
US 2002/0065138 A1 May 30, 2002

(51) Int. Cl.[7] .............................. B21K 1/04; B21D 53/10
(52) U.S. Cl. ........................ 29/898.066; 29/898.065; 29/898.13; 29/558; 82/1.11
(58) Field of Search ...................... 29/898.063, 898.065, 29/898.066, 898.068, 557, 558, 898.054, 898.056; 464/142, 143, 145, 146, 906; 82/1.11; 384/567

(56) References Cited

U.S. PATENT DOCUMENTS 3,553,979 A * 1/1971 Noguchi et al.
4,319,465 A * 3/1982 Ito et al.
4,575,362 A * 3/1986 Girguis
4,611,373 A * 9/1986 Hazebrook
5,067,929 A * 11/1991 Krude
5,509,857 A * 4/1996 Flaugher
5,788,578 A * 8/1998 Shimizu et al.
6,132,316 A * 10/2000 Statham

FOREIGN PATENT DOCUMENTS

| EP | 921329 | * | 6/1999 |
| GB | 2 155 367 A | | 9/1985 |
| GB | 2 318 852 A | | 5/1998 |
| GB | 2 347 730 A | | 9/2000 |
| JP | 55-126124 | * | 9/1980 |

* cited by examiner

Primary Examiner—Gregory Vidovich
Assistant Examiner—Eric Compton
(74) Attorney, Agent, or Firm—John Kajander

(57) ABSTRACT

A method of reducing hard machining time, and correspondingly increasing hard machining tooling life, of a non plunging type constant velocity joint for use in reduced angle applications. The method comprises forming a recess having a larger formed radius in a portion of the ball track and cage track areas that is non-functional in low angle operations prior to heat treat hardening. The new process results in a significant reduction of approximately forty-five percent in the hard machining of the ball and cage track surfaces.

17 Claims, 3 Drawing Sheets

METHOD FOR REDUCING HARD MACHINING TIME OF A CONSTANT VELOCITY JOINT

TECHNICAL FIELD

The present invention relates generally to drive systems and more particularly to a method for reducing hard machining time of a constant velocity joints.

BACKGROUND

A key element in the driveline and drive train of a rear-wheel drive vehicle is a power transfer mechanism called a fixed axle. The fixed axle combines transmission and differential in a single unit. In rear-wheel drive systems used on vehicles, the drivetrain is compacted into an engine/transmission/propshaft/fixed-axle/driving-axle "package" that provides torque force to the rear wheels.

The main purpose of the driving axles is to transmit engine torque from the final drive unit to the rear wheels. As part of the driving axle assembly, the constant velocity joints ("CV joints") are designed to operate at various angles to accommodate up and down movement of the rear wheels. Some CV joints also permit shaft length changes caused by up-and-down movement of the rear wheels and by fixed axle movement due to torque reaction.

The driving axle typically has CV joints at both "inboard" and "outboard" ends. The inboard CV joint generally consists of an outer race and stub shaft, an inner race, a cage, ball bearings, and a ball retainer. The outer race is called a "plunge" type because it has elongated grooves which allows the bearing cage and bearings to slide in and out as the front wheels go up and down. The inboard CV joint stub shaft is splined to the differential side gear.

The outboard CV joint generally consists of an outer race, a cage, an inner race, and ball bearings. The CV joint outer race stub shaft is splined to accommodate a splined hub that is pressed on and held by a staked nut. Typically, this is referred to as a ball-type fixed CV joint.

These CV joints use the rolling ball bearings in curved grooves to obtain uniform motion. The balls, which are the driving contact, move laterally as the joint rotates. This permits the point of driving contact between the two halves of the coupling to remain in a plane that bisects the angle between the two shafts.

Typically, fixed, ball-type CV joints are manufactured by heat treating the near net-shaped cage and ball track to a desired surface hardness and case depth. The surfaces are then hard machined the entire length of the bearing surfaces to provide a minimum of 45 degrees of articulation.

One problem with the currently available manufacturing technology is that amount of time necessary to hard machine the entire surface of the ball track and/or cage track area. This also has an adverse effect on tool life. In a rear wheel drive application, forty-five degrees of articulation is not required since the outboard CV joint does not have to compensate for wheel steering as in the front wheels. The fixed ball type CV joint can be optimized to operate at reduced angles by minimizing the functional ball track and cage track areas. Thus, only a portion of the ball track and cage track areas, in low angle operations, needs to be hard machined.

SUMMARY OF THE INVENTION

Objects of the present invention are to reduce the amount of hard machining time for the ball track and/or cage track areas and to improve the tool life by minimizing the functional ball track and/or cage track area that must be hard machined after heat treating.

The above objects are accomplished by forming a recess in the ball track and/or cage track areas that are non-functional during low angle operation of the CV joint assembly. This is done prior to heat treat hardening of the component either during the forging process or during machining of the unhardened component.

This new process results in a significant reduction in the hard machining area of the ball and cage track surfaces. The cage and ball track relief areas have a larger formed (prior to heat treat) radius than the finished radius, providing hard machining tool clearance. This reduction in hard machining area also improves the tool life by reducing the amount of hard machining that is done by the tool per unit.

Other objects and advantages of the present invention will become apparent upon considering the following detailed description and appended claims, and upon reference to the accompanying drawings.

DESCRIPTION OF THE PREFERRED EMBODIMENT(S)

Figure 1:
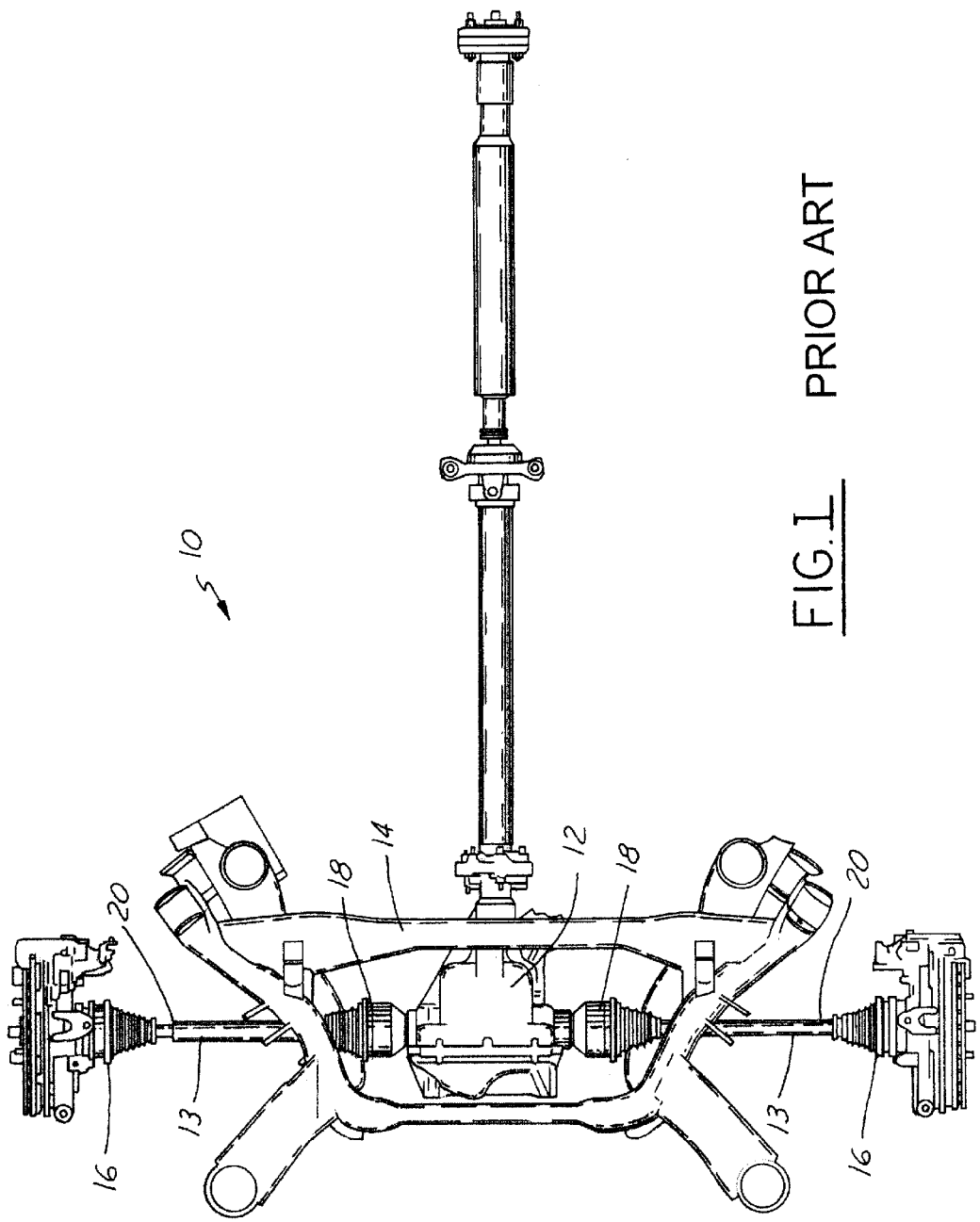
FIG. 1 is a perspective view a rear wheel drive system.

Referring now to FIG. 1, a rear wheel drive system 10 is shown having a fixed axle 12 mounted to the sub-frame 14. The fixed axle 12 is also coupled to a driving axle 13. The driving axle 13 has as its major components a first pair of outer fixed ball-type CV joints 16 and a second pair of plunging type inner CV joints 18. An interconnecting shaft 20 is used to couple one of the outer CV joints 16 to one of the inner CV joints 18. The outer CV joints 16 are coupled to a hub assembly 22 in a method that is well known in the art.

Figure 2:
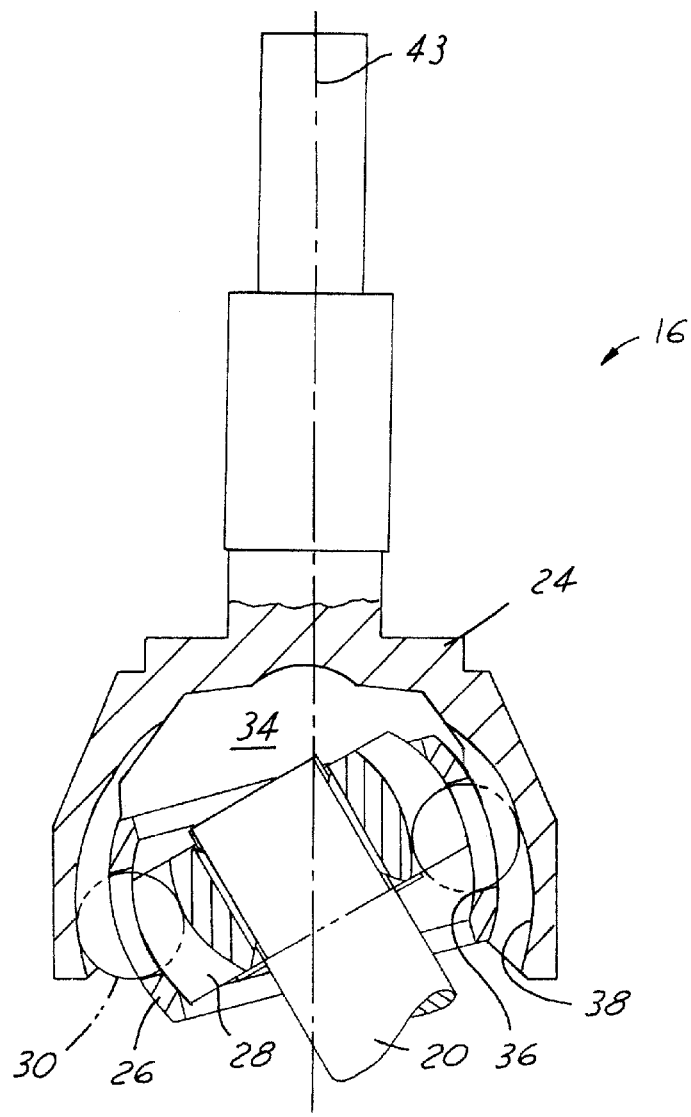
FIG. 2 is a perspective view of a fixed ball type CV joint.

Referring now to FIG. 2, the outer fixed ball-type CV joints 16 are Rzeppa-type fixed ball bearing CV joints. The outer CV joints 16 consists of an outer race 24, a cage 26, an inner race 28, and a plurality of ball bearings 30. Typically, six ball bearings 30 are contained in the outer CV joint 16. An interconnecting shaft 20 is coupled within the inner region 34 of the outer CV joint 16. Typically, these outer CV joints 16 allow for forty-seven degrees of articulation about a centerline 43 in operation. For low angle operations, these CV joints 16 are optimized to allow only approximately twenty-five degrees of articulation.

For low angle applications, the entire cage track surface 36 and ball track surface 38 are hard machined by either a grinding or hard milling (hard turning) process to a pre-defined radius. This extra hard machining of unused surfaces increases cycle time and reduces tool life on a per part basis, resulting in increased costs.

Figure 3:
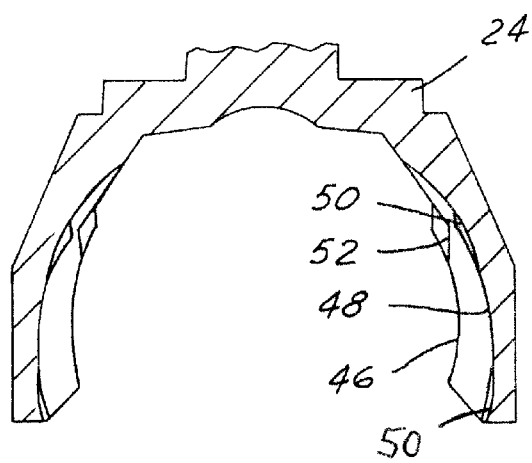
FIG. 3 is a perspective view a fixed ball type CV joint showing both a typical ball and cage track area and the improvement by adding a recess in the ball track and cage track according to a preferred embodiment of the present invention.

In the present invention, however, as shown in FIG. 3, only a portion of the cage track surfaces and the ball track surfaces are hard machined, therein forming a finished ball track surface 48, a finished cage track surface 46, ball track relief surface 50, and a cage track relief surface 52. The length of the finished ball track surface 48 and finished cage track surface 46 corresponds to slightly more than the allowable amount of articulation for the CV joint 16 in low angle operations. In a preferred embodiment, the length is set to allow for approximately twenty-five degrees of articulation relative to a centerline 43. This represents approximately 45% less area on the finished ball track surface 48 and 25% less area on the finished cage track surface 46 that must be hard machined as described below in FIG. 4.

Figure 4:
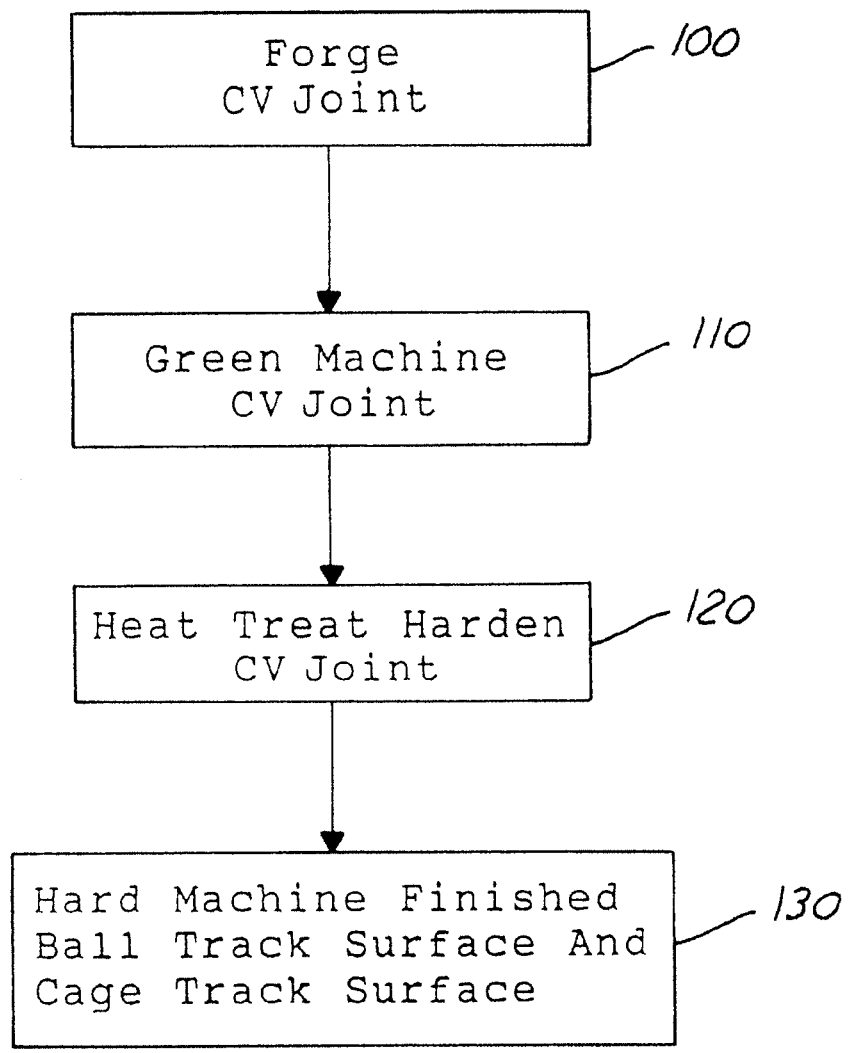
FIG. 4 is a logic flow diagram for making the fixed ball type CV joint of FIG. 3.

Referring now to FIG. 4, a logic flow diagram for creating a CV joint 16 according to the present invention is shown. In Step 100, the CV joint 16 is forged in a method well known in the art. This forging step creates a ball track surface and cage track surface having a formed first radius and a ball track relief surface 50 and a cage track relief surface 52 having a formed second radius. The second radius is always greater than the first radius.

Next, in Step 110, the CV joint 16 is green machined to create add features to its outer profile in a method that is well known in the art. For example, the green machining may introduce splines (not shown) to the outer profile. Then, in Step 120, the CV joint 16 is heat treat hardened to a desired hardness. Depending upon the type of steel used within the CV joint 16, either an induction hardening process or a carburized hardening process comprises the heat treat hardening process step.

Finally, in Step 130, the ball track surface and cage track surfaces are hard machined to form a finished ball track surface 48 and a finished cage track surface 46. This is accomplished by either grinding or hard milling (hard turning for cage track surface) the ball track and cage track surfaces. Because the surfaces 50, 52 are recessed to a second radius, these surfaces 50, 52 are not hard machined. These surfaces 50, 52 represent approximately a 45% reduction of the total surface area in the cage track and ball track that is hard machined. This 45% reduction in hard machining reduces the hard machining time on a per part basis and improves the hard machining tool life. This results in additional savings on a per part basis.

The present invention substantially improves the cycle time for creating a CV joint 16 for low angle applications by decreasing the amount of ball track and cage track surface area that must be hard machined. Further, because less hard machining is required per CV joint 16, the lifetime of the hard machining tool is increased proportionately. These result in substantial cost savings on a per joint basis.

While the invention has been described in terms of preferred embodiments, it will be understood, of course, that the invention is not limited thereto since modifications may be made by those skilled in the art, particularly in light of the foregoing teachings.

What is claimed is:

1. A method to reduce hard machining time in a fixed ball-type CV joint having a ball track and a cage track for use in low angle operations, the method comprising the steps of:
   reducing the surface area of the ball track that is hard machined by a first percentage by introducing a ball track relief area within the ball track, said ball track relief area not used during joint operation; and
   reducing the surface area of the cage track that is hard machined by a second percentage by introducing a cage track relief area within the cage track, said cage track relief area not used during joint operation.

2. The method according to claim 1, wherein the steps of reducing the surface area of the ball track and reducing the surface area of the cage track comprises the steps of:
   reducing the surface area of the ball track that is hard machined by approximately forty-five percent by introducing a ball track relief area within the ball track; and
   reducing the surface area of the cage track that is hard machined by approximately twenty-five percent by introducing a cage track relief area within the cage track.

3. The method according to claim 1, wherein said first percentage and said second percentage are a function of the allowable articulation angle of the fixed ball-type CV joint in a low angle operation.

4. The method according to claim 1, wherein the step of reducing the surface area of the ball track that is hard machined comprises the steps of:
   forging a ball track recess area and a ball track region within the ball track, wherein said ball track recess area has a first radius and said ball track region has a second radius, said first radius having a larger formed radius than said second radius;
   heat treat hardening the ball track; and
   hard machining said ball track region to form a finished ball track region.

5. The method according to claim 1, wherein the step of reducing the surface area of the ball track that is hard machined comprises the steps of:
   machining a ball track recess area and a ball track region within the ball track, wherein said ball track recess area has a first radius and said ball track region has a second radius, said first radius having a larger formed radius than said second radius;
   heat treat hardening the ball track; and
   hard machining said ball track region to form a finished ball track region.

6. The method according to claim 1, wherein the step of reducing the surface area of the cage track that is hard machined comprises the steps of:
   forging a cage track recess area and a cage track region within the cage track, wherein said cage track recess area has a first radius and said cage track region has a second radius, said first radius having a larger formed radius than said second radius;
   heat treat hardening the cage track; and
   hard machining said cage track region to form a finished cage track region.

7. The method according to claim 1, wherein the step of reducing the surface area of the cage track that is hard machined comprises the steps of:
   machining a cage track recess area and a cage track region within the cage track, wherein said cage track recess area has a first radius and said cage track region has a second radius, said first radius having a larger formed radius than said second radius;
   heat treat hardening the cage track; and
   hard machining said cage track region to form a finished cage track region.

8. The method according to claim 1, wherein the steps of reducing the surface area of the ball track that is hard machined and reducing the surface area of the cage track that is hard machined comprises the steps of:
   forging a ball track recess area and a ball track region within the ball track, wherein said ball track recess area has a first radius and said ball track region has a second radius, said first radius having a larger formed radius than said second radius;
   forging a cage track recess area and a cage track region within the cage track, wherein said cage track recess area has a third radius and said cage track region has a fourth radius, said third radius having a larger formed radius than said fourth radius;

heat treat hardening the ball track and the cage track; and hard machining said ball track region to form a finished ball track region and hard machining said cage track region to form a finished cage track region.

9. The method according to claim 1, wherein the steps of reducing the surface area of the ball track that is hard machined and reducing the surface area of the cage track that is hard machined comprises the steps of:

machining a ball track recess area and a ball track region within the ball track, wherein said ball track recess area has a first radius and said ball track region has a second radius, said first radius having a larger formed radius than said second radius;

machining a cage track recess area and a cage track region within the cage track, wherein said cage track recess area has a third radius and said cage track region has a fourth radius, said third radius having a larger formed radius than said fourth radius;

heat treat hardening the ball track and the cage track; and hard machining said ball track region to form a finished ball track region and hard machining said cage track region to form a finished cage track region.

10. The method of claim 8, wherein the step of heat treat hardening the ball track and the cage track comprises the step of induction heat treat hardening the ball track and the cage track.

11. The method of claim 8, wherein the step of heat treat hardening the ball track and the cage track comprises the step of carburizing heat treat hardening the ball track and the cage track.

12. The method of claim 9, wherein the step of heat treat hardening the ball track and the cage track comprises the step of induction heat treat hardening the ball track and the cage track.

13. The method of claim 9, wherein the step of heat treat hardening the ball track and the cage track comprises the step of carburizing heat treat hardening the ball track and the cage track.

14. The method of claim 8, wherein the steps of hard machining said ball track region to form a finished ball track region and hard machining said cage track region to form a finished cage track region comprises the steps of grinding said ball track region to form a finished ball track region and grinding said cage track region to form a finished cage track region.

15. The method of claim 9, wherein the steps of hard machining said ball track region to form a finished ball track region and hard machining said cage track region to form a finished cage track region comprises the steps of grinding said ball track region to form a finished ball track region and grinding said cage track region to form a finished cage track region.

16. The method of claim 8, wherein the steps of hard machining said ball track region to form a finished ball track region and hard machining said cage track region to form a finished cage track region comprises the steps of hard milling said ball track region to form a finished ball track region and hard turning said cage track region to form a finished cage track region.

17. The method of claim 9, wherein the steps of hard machining said ball track region to form a finished ball track region and hard machining said cage track region to form a finished cage track region comprises the steps of hard milling said ball track region to form a finished ball track region and hard turning said cage track region to form a finished cage track region.

* * * * *